United States Patent [19]

Miller

[11] 4,171,932

[45] Oct. 23, 1979

[54] LIQUID LEVEL SENSOR, PUMP SYSTEM MEANS AND CIRCUIT MEANS

[75] Inventor: Gerald K. Miller, Hersey, Mich.

[73] Assignee: Nartron Corporation, Reed City, Mich.

[21] Appl. No.: 836,013

[22] Filed: Sep. 23, 1977

[51] Int. Cl.² .................................................. F04B 49/06
[52] U.S. Cl. ...................................... 417/36; 307/118; 417/12; 417/44; 417/63
[58] Field of Search ................. 417/7, 36, 44, 38, 12, 417/63; 137/392; 307/118; 318/482

[56] References Cited

U.S. PATENT DOCUMENTS

| | | | |
|---|---|---|---|
| 3,030,890 | 4/1962 | Galik | 417/36 X |
| 3,094,646 | 6/1963 | Swett | 318/482 X |
| 3,502,899 | 3/1970 | Jones | 417/36 X |
| 3,540,027 | 11/1970 | Rauth et al. | 417/36 X |
| 3,726,607 | 4/1973 | Garman | 417/12 |
| 3,741,683 | 6/1973 | McTamaney et al. | 417/7 |
| 3,855,515 | 12/1974 | Hutchins | 417/38 X |
| 4,021,700 | 5/1977 | Ellis-Arwyl | 318/447 X |
| 4,047,844 | 9/1977 | Robinson | 417/63 X |
| 4,061,442 | 12/1977 | Clark et al. | 417/36 |

Primary Examiner—Carlton R. Croyle
Assistant Examiner—Edward Look
Attorney, Agent, or Firm—Lon H. Romanski

[57] ABSTRACT

A plurality of probes are situated as to experience being touched by the liquid being monitored; when at least one of such probes is touched by the liquid related electrical circuit means becomes energized as to cause related pumping means to be activated thereby pumping some of the monitored liquid to, in turn, reduce the level of such monitored liquid; when the level of the monitored liquid decreases to a predetermined level, the pumping means is automatically de-activated; during periods wherein there might occur a momentary splashing or sloshing of the monitored liquid, time delay means serves to correspondingly delay activation of said pumping means thereby preventing unnecessary activation of the pumping means.

26 Claims, 11 Drawing Figures

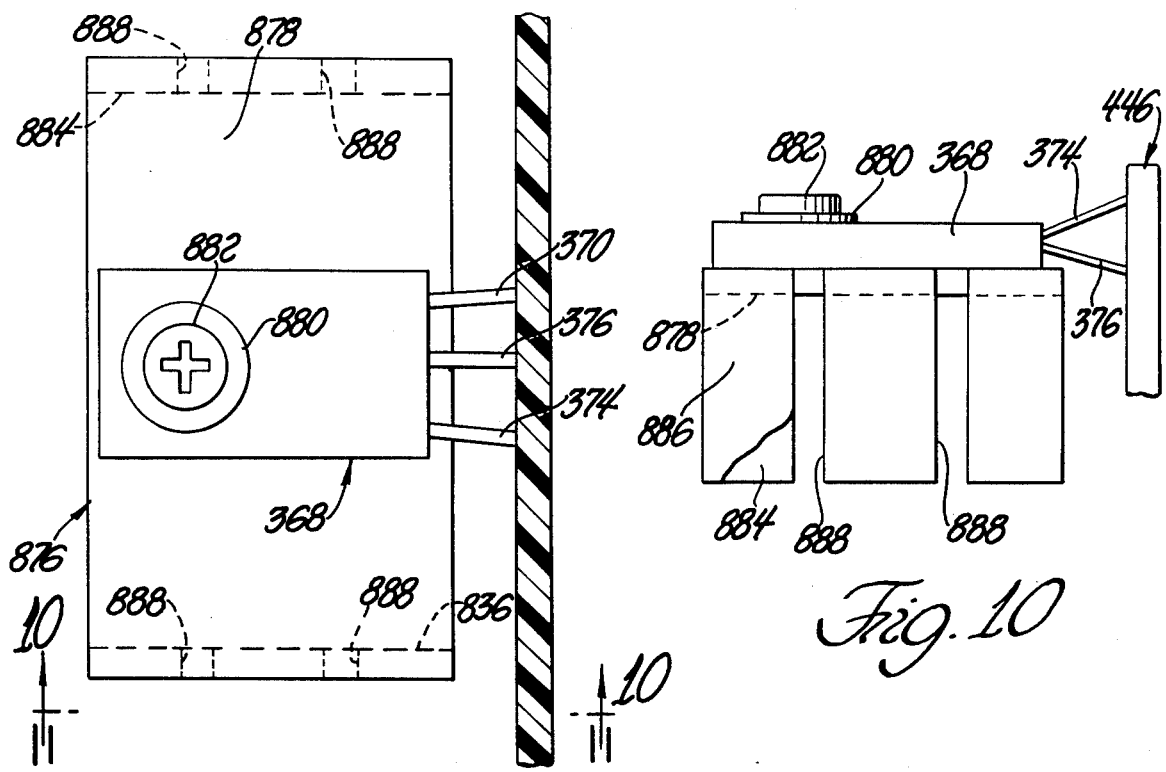
Fig. 9
Fig. 10
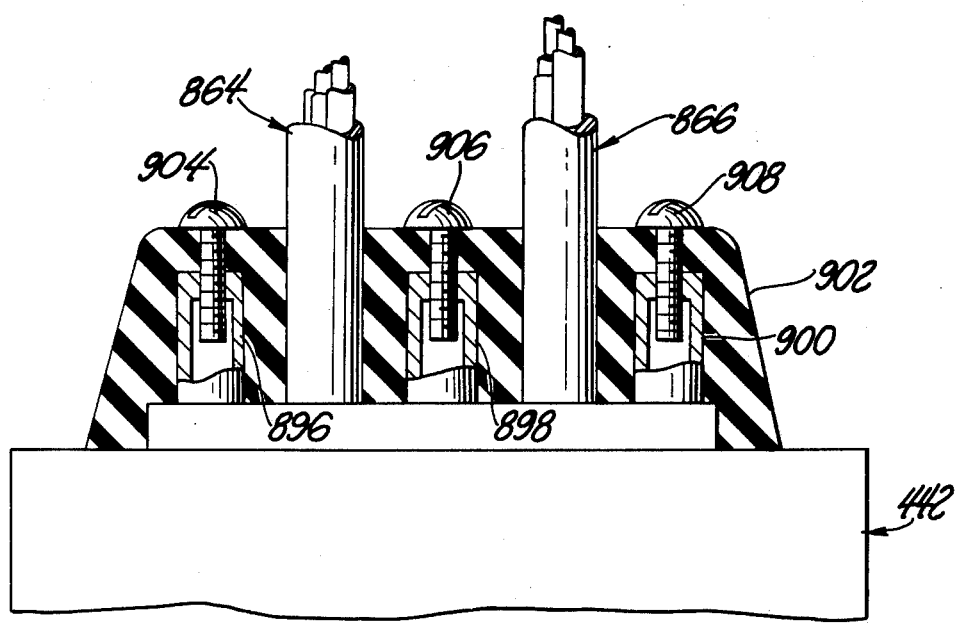
Fig. 11

LIQUID LEVEL SENSOR, PUMP SYSTEM MEANS AND CIRCUIT MEANS

BACKGROUND OF THE INVENTION

Generally, the invention relates to the monitoring of liquid levels and to the automatic pumping of such liquid levels as to thereby, generally, be capable of maintaining the level of such monitored liquid below a preselected maximum level, or when considered from yet another point of view, maintaining the level of such monitored liquid within a preselected range of levels. As will become apparent, even though the invention was first conceived in the course of desiring to solve the prior art problems as relate to boat and/or ship bilge pumping systems, the invention, as conceived, and as hereinafter more fully disclosed has applications to fields other than such bilge pumping systems. However, to better appreciate the significance of the invention, the background of the invention will be set forth as it applies to the heretofore prior art proposed bilge pumping systems.

As is well known and recognized, almost without exception, water craft and/or vehicles, for varying reasons, accumulate liquids in the bilge area. In some cases such liquid may be water while in other cases the bilge liquid may even be comprised of oil, gasoline or other substances, singly or in any combination, which may also be mixed with water. Often, such bilges also contain various bits of debris which may or may not float in the liquid but which is, nevertheless, movable therewithin.

Further, since the bilge is generally at the lower part of the hull (or body) of the water craft and since hulls are somewhat streamlined or otherwise non-uniform longitudinally along the keel, it is apparent that, for example, the same level of liquid along the length of the hull does not denote the same unit of volume of such liquid if measured at regular intervals longitudinally along the hull. In other words, the hull may be considered as a vessel of irregular configuration containing therein the bilge liquid. Consequently, if the hull is at rest and not moving with respect to the water, the level of the bilge liquid may be at a first elevation and span the entire distance from the stem to the stern; however, if the hull is then somewhat tilted as to have, for example, the stem or prow become relatively elevated, the level and relative attitude of that same quantity of bilge liquid will change and, quite possibly, will no longer span the entire distance from stem to stern.

Further, during operation of the water craft, the bilge liquid often undergoes sloshing due to, for example, the water craft executing turns or experiencing waves. This, in turn, causes the surface of the bilge liquid to rapidly and randomly change in configuration and relative location.

Heretofore, the prior art bilge pumping systems, which were considered to be automatic, employed such devices as float members to sense, by buoyant displacement, the presence of bilge liquid. Such float members, in turn, were employed to open and close related electrical switch means in order to thereby deenergize and energize electrical motors means for driving related pump means. However, as should be apparent, the prior art float members were totally responsive to level of the bilge liquid even if that level was momentary or a false indication of the actual quantity of bilge liquid carried by the water craft. That is, if the relative level and attitude of the bilge liquid was changed for a short period of time, as during turns, etc., the prior art float would respond to the resulting presence or absence of the bilge liquid and accordingly activate or de-activate the pumping means. The same situation would occur when the bilge liquid experienced sloshing.

Also, as the water craft experienced water or wave pounding and reacted as by rolling or pitching, the prior art float members would also become unstable, due to inherent inertia, again resulting in undesired activation and de-activation of relating pumping means.

The prior art floats were often associated with related moving linkage means in order that relative motion of the float could be sensed as to thereby activate and de-activate associated pumping means. This raisd other problems associated with dirt and corrosion which often prevented such linkage means from having the freedom of relative motion necessary to permit the float to move in response to changes in level of the bilge liquid.

Accordingly, the invention as herein disclosed is primarily directed to the solution of the foregoing as well as other related and attendant problems whether in the art of bilge pumping systems or in other applications of pumping and/or liquid level sensing systems.

SUMMARY OF THE INVENTION

According to the invention, a liquid pumping system comprises at least one electrical probe means, electrical circuit means associated with said probe means, and liquid pumping means, said probe means being effective when in the presence of said liquid to generate related electrical signal means, said electrical circuit means being effective to in turn create an electrical output in response to said electrical signal means, and said liquid pumping means being activated in response to said electrical output in order to thereby pump said liquid from a first area to a second discharge area.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain elements and/or details are omitted from one or more views:

FIG. 9 is a fragmentary view taken generally on the plane of line 9—9 of FIG. 8 and looking in the direction of the arrows;

FIG. 10 is a fragmentary view taken generally on the plane of line 10—10 of FIG. 9 and looking in the direction of the arrows; and FIG. 11 is a fragmentary end view, partially in cross-section, taken generally of the plane of line 11—11 of FIG. 6 and looking in the direction of the arrows.

DETAILED DESCRIPTION OF THE PREFERRED EMBODIMENT

Figure 1:
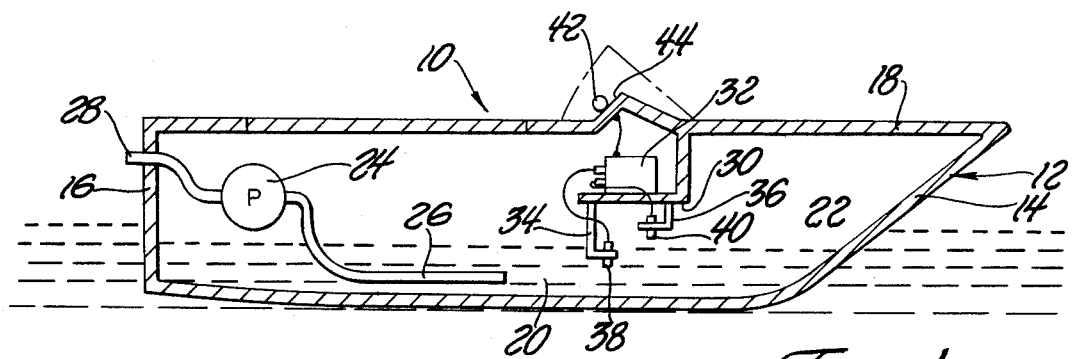
FIG. 1 is a simplified diagrammatic illustration, in longitudinal cross-section, of a water craft provided with apparatus employing teachings of the invention.

Referring now in greater detail to the drawings, FIG. 1, in simplified form, illustrates, in generally longitudinal cross-section, a boat or water craft 10 having a hull 12 with a prow or stem 14 and stern 16 along with related decking 18. The bilge area 20 is shown as containing bilge liquid 22. Suitable liquid pumping means 24, carried as within the hull 12, has an intake or inlet conduit means 26 and an outlet or discharge conduit means 28. Intake conduit 26 may extend, as generally depicted, to any desired area within the bilge and be situated as to be quickly submerged as by the accumulation of even a relatively slight amount of bilge liquid. Further, if desired, the intake end of inlet conduit means 26 may be provided with suitable screen or filter means as to thereby guard against foreign matter becoming lodged therewithin.

Suitable suppport or platform means 30 serves to support electrical control means 32 while support member 34 and 36 respectively hold probes 38 and 40 at preselected elevations. Related sensory signal or warning means 42, carried as on instrument panel means 44, serves to provide desired sensory signals to the water craft operator.

Figure 2:
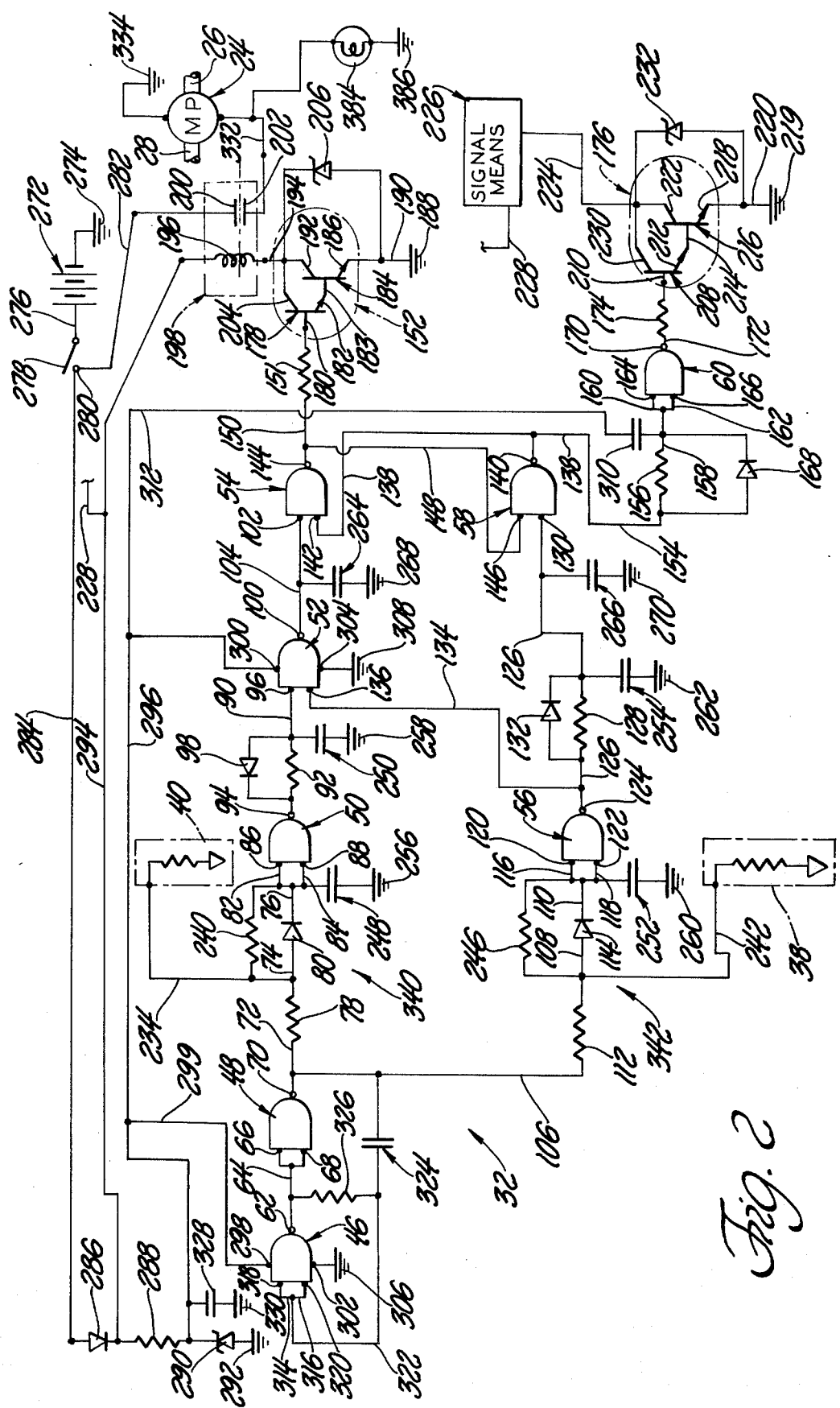
FIG. 2 is a schematic wiring diagram of circuitry embodying teachings of the invention.

Referring to FIG. 2, the electrical circuitry 32 is illustrated as comprising a plurality of C-MOS type integrated circuit NAND gates 46, 48, 50, 52, 54, 56, 58 and 60. The output terminal 62 of gate 46 is electrically connected via conductor means 64 to both input terminals 66 and 68 of gate 46; the output terminal 70 of gate 48 is connected as via conductor means 72, 74 and 76, series resistor means 78 and diode means 80, and branch conductors 82 and 84 to both input terminals 86 and 88 of gate 50.

Conductor means 90 comprising series resistance means 92 serves to electrically connect output terminal 94 of gate 50 with input terminal 96 of gate 52. A diode 98 is placed electrically in parallel with resistance 92. Gate 52, in turn, has its output terminal 100 electrically connected to input terminal 102 of gate 54 as by conductor means 104.

Conductor means 106, 108 and 110 along with series resistance means 112 and diode means 114 as well as branch conductor means 116 and 118 serve to electrically interconnect both input terminals 120 and 122 of gate 56 to conductor 72 and the output terminal 70 of gate 48.

The output terminal 124 of gate 56 is electrically connected via conductor means 126 and series resistance means 128 to an input terminal 130 of gate 58. A diode 132 is placed in parallel with resistance 128. Output terminal 124 is also electrically connected as by conductor means 134 to the second input terminal 136 of gate 52.

Conductor means 138 serves to electrically connect the output terminal 140 of gate 58 to the second input terminal 142 of gate 54. Similarly, the output terminal 144 of gate 54 is electrically connected to the second input terminal 146 of gate 58 as by conductor means 148 electrically connected to terminal 146 as through conductor means 150 and resistance means 151 leading to a Darlington circuit 152.

The output terminal 140 of gate 58 is also electrically connected as through conductor means 138, 154, series resistance 156, conductor 158 and branch conductors 160 and 162 to both input terminals 164 and 166 of gate 60. A diode 168 is placed electrically in parallel to resistance 156.

The output terminal 170 of gate 60 is connected as by conductor means 172 and series resistance means 174 to a second Darlington circuit 176. As illustrated, the Darlington circuit 152 comprises a first NPN transistor 178 which has its base electrode 180 electrically connected to the other end of resistor 151 while its emitter 182 is connected to the base 183 of a second NPN transistor 184. The emitter 186 of transistor 184 is connected to ground 188 as by conductor means 190 while the collector 192 is connected as by conductor means 194 to the field winding 196 of an associated relay assembly 198 comprising openable and closeable electrical contacts 200 and 202 responsive to the energization and de-energization of winding 196. The collector 204 of transistor 178 is also connected to conductor means 194 and collector 192, while a zener diode 206 is placed in parallel with the emitter-collector circuit of transistor 184.

Similarly, Darlington circuit 176 comprises a first NPN transistor 208 which has its base electrode 210 electrically connected to the other end of resistance 174 while its emitter 212 is connected to the base 214 of a second NPN transistor 216. The emitter 218 of transistor 216 is connected to ground 219 as via conductor means 220 while the collector 222 is connected as by conductor means 224 to associated output or sensory signal producing means 226 which may be, in turn, electrically connected to conductor means 294 as by conductor means 228. The collector 230 of transistor 208 is also connected to conductor means 224 and to collector 222 of transistor 216 while a zener diode 232 is placed in parallel with and across the emitter-collector circuit of transistor 216.

The upper or higher elevation probe 40 is electrically connected as through conductor means 234 to conductor means 74 as at a point generally between resistance 78 and diode 80. Further, resistance means 240 is placed generally in parallel with diode 80.

The lower or lesser elevation probe 38 is electrically connected as through conductor means 242 to conductor means 108 as at a point generally between resistance 112 and diode 114. Further, resistance means 246 is placed generally in parallel with diode 114.

Capacitor means are provided as at 248, 250, 252 and 254 respectively grounded as at 256, 258, 260 and 262. The other electrical sides of such capacitors are respectively electrically connected to conductor means 76, 90, 110 and 126. If it should be desired, further capacitor means may be provided as at 264 and 266, respectively grounded as at 268 and 270 and having their other electrical sides respectively electrically connected to conductor means 104, as generally between output terminal 100 and input terminal 102, and conductor means 126, as generally between where capacitor 254 is connected and input terminal 130.

A suitable source of electrical potential 272, grounded as at 274, has its other terminal electricaly connected to conductor means 280, in turn, connected means 282 leading to relay contact 200 and conductor means 284 leading to a diode 286.

A resistor 288 is connected in series with diode 286 and a zener diode 290 which, in turn, is grounded as at 292. Conductor means 294, electrically connected to resistor 288 as at a point generally between diode 286 and resistor 288 is connected to the other end of relay field winding 196 while a second conductor 296 electrically connected as at a point generally between resistor 288 and zener diode 290 is electrically connected to gates 46 and 52 as at respective terminals 298 and 300 as by conductor portions 299 and 301. Gates 46 and 52 have their respective other terminals 302 and 304 connected to ground as at 306 and 308. In the embodiment shown, gates 46, 48, 50 and 56 may comprise a first quad-chip and, therefore, the logic power may be supplied to all through one connection as depicted with respect to gate 46. Similarly, gates 52, 54, 58 and 60 may also comprise a second quad-chip and, therefore, the logic power may be supplied to all through one connection as depicted with respect to gate 52.

A capacitor 310 has its one electrical side electrically connected to conductor 158 while its other electrical side is connected to conductor 296 as via conductor means 312.

With reference to gates 46 and 48, it can be seen that through branch conductor means 314 and 316, both input terminals 318 and 320 of gate 48 are electrically connected to conductor means 322 which, in turn, is electrically connected to one side of capacitor means 324 the other electrical side of which is electrically connected to conductor means 106 and, therethrough, to output terminal 70 of gate 48. A resistor 326 has one end connected to conductor 322 while its other end is connected to conductor 64. A capacitor 328, grounded as at 330, is preferably connected to conductor means 296 to filter any electrical noise therein. Also, as can be seen, relay contact 202 is electrically connected as by conductor means 332 as to motor-pump assembly 24 which may be grounded as at 334.

General Operation of Invention

As should be apparent, diode 286, resistance 288, zener 290 and capacitor 328 comprise a regulated power supply means with, of course, the voltage on conductor means 294 being relatively greater than the voltage on conductor means 296.

Gates 46, 48, 50 and 56 both amplify and invert. Further, gates 46 and 48 along with resistance 326 and capacitor 324 comprise and function as oscillator means having an output, at terminal 70 of gate 48, of fixed frequency. The output from terminal 70 is fed through resistor 78 and conductor 234 to probe 40 as well as though conductor 106, resistor 112 and conductor 242 to probe 38. Further, probe 40, generally, acts as a voltage divider in conjunction with resistance 78. Resistor 240, diode 80 and capacitor 248 combine to function as detector means 340. That is, when probe 40 is out of the bilge liquid, it creates, effectively, what can be thought of as a relatively high resistance causing the detector means to provide an "on" signal resulting in input terminals 86 and 88 of gate 50 having applied thereto a "high" signal. Similarly, when probe 38 is out of the bilge liquid, it, too, creates what can be thought of as a relatively high resistance causing the associated detector means 342, comprised of resistor 112, diode 114 and capacitor 244, to provide an "on" signal resulting in input terminals 120 and 122 of gate 56 having applied thereto a "high" signal. Whenever the input signals on both inputs 86 and 88 are "high", the signal at the output 94 of gate 50 is "low"; likewise, when the input signals on both inputs 120 and 122 are "high", the signal at the output 124 of gate 56 is "low". Consequently, it can be seen that in the logic of the circuitry gates 50 and 56 act as amplifying inverters and provide no NAND gate function at all.

Now, let it be assumed that both probes 40 and 38 are immersed in the bilge liquid. As a consequence of this the relative apparent resistance of probes 40 and 38 diminish to a point that such appear as respective short circuits to detector means 340 and 342. As a result thereof, the input signals on input terminals 86 and 88 of gate 50 go "low" and, likewise, the signals on input terminals 120 and 122 of gate 56 go "low". Since gates 50 and 56 invert, the output signals on each of the respective output terminals 94 and 124 then become "high".

As can be seen, the outputs of gates 50 and 56 are applied to the respective input terminals 96 and 136 of NAND gate 52 and, since each of such input signals is "high" the inverting function of gate 52 causes its output at terminal 100 to go "low" which, in turn, causes the signal at input terminal 102 of NAND gate 54 to also be "low". At the same time, the "high" output signal from gate 56 is applied to the input terminal 130 of NAND gate 58. Consequently, the output at terminal 140 of gate 58 becomes "low" and such is applied to the input 142 of NAND gate 54. With both inputs 102 and 142 of gate 54 being "low", the gate 54 is turned on and the signal at the output 144 becomes "high". As should be noted, the "high" output on conductor 150 is fed back to input terminal 146 of NAND gate 58 which becomes a latching arrangement in that now both inputs 146 and 130 of gate 58 are maintained at a "high" signal, thereby maintaining gate 54 on, for as long as the lower probe 38 is engaged with the bilge liquid.

The thusly established "high" output signal from output 144 is applied to the base-emitter diode of transistor 178 causing such to be turned on, or made conductive, and, in turn, causing transistor 184 to be likewise made conductive. The circuit through conductor means 294 then becomes closed causing energization of the field relay winding 196 and consequent closure of contacts 200 and 202. With contacts 200 and 202 thusly closed, the motor-pump means 24 is energized and the bilge liquid pumped from the intake 26 to and through the outlet 28 thereby lowering the level of the bilge liquid 22 (FIG. 1).

When the level of the bilge liquid reduces itself to an elevation below that of upper probe 40, the apparent resistance of such probe 40, as far as detector means 340 is concerned, becomes relatively great thereby causing the input terminals 86 and 88 of gate 50 to experience relatively "high" input signals which, in turn, cause output terminal 94 to produce a "low" signal as an input to input terminal 96 of gate 52. However, since both input terminals 96 and 136 where previously experiencing "high" input signals and since the input signal on terminal 136 still remains "high", the signal on the output terminal 100 of gate 52 will remain "low" thereby enabling gates 58 and 54 to remain latched and continuing energization of pumping means 24 to further reduce the level of the bilge liquid. This latched condition will continue until, generally, the level of the bilge liquid is reduced to below that of the lower probe 38.

When the level of the bilge liquid is thusly sufficiently reduced and probe 38 is out of the liquid, the apparent resistance of the probe 38, as far as detector means 342 is concerned, appears to be relatively high thereby causing the signals applied to both input terminals 120 and 122 of gate 56 to become "high" and the output at terminal 124 to become "low" which, in turn, is applied to input terminal 136 of gate 52 thereby now causing the output signal at terminal 100 of gate 52 to become "high". Generally, at the same time, the "low" output signal at terminal 124 is also applied via conductor means 126 to input terminal 130 of gate 58 causing: the output at terminal 140 to go "high"; the input at terminal 142 of gate 54 to go "high"; the output at terminal 144 of gate 54 to go "low" and the input at terminal 146 of gate 58 to go "low". Consequently, gates 54 and 58 become unlatched from each other and since the output of gate 54 is "low" the forward biasing of the Darlington circuit 152 is eliminated and the circuit through the emitter-collector diode of transistor 184 is in effect opened thereby causing de-energization of the field winding 196 and the pumping means 24.

Now, after the pumping means 24 has been de-energized as already discussed, let it be assumed that for some reason, as for examples hull leakage, etc., the level of the bilge liquid again starts to increase. As it increases and first causes the lower probe 38 to be in contact therewith, the resulting apparent short circuit (apparent to detector means 342) of probe 38 results in a "low" signal to be experienced by input terminals 120 and 122 of gate 56 thereby causing output signal on terminal 124 to become "high" which, in turn, causes a "high" input signal to be placed on terminal 136 of gate 52 and terminal 130 of gate 58. However, since immediately preceding, both input terminals 96 and 136 of gate 52 and both input terminals 146 and 130 of gate 58 had "low" input signals thereon, the outputs at terminals 100 and 140 of gates 52 and 58, respectively, will continue to have a "high" output. Therefore, both inputs to terminals 102 and 142 of gate 54 remains "high" and the output signal at terminal 144 of gate 54 also remains "low" thereby not placing the Darlington circuit 152 into conduction.

When the level of the bilge liquid increases sufficiently to contact upper probe 40, the resulting apparent short circuit (apparent to detector means 340) of probe 40 results in a "low" signal to be experienced by input terminals 86 and 88 of gate 50 thereby causing output signal on terminal 94 to become "high" which, in turn, causes a "high" signal to be placed on input terminal 96 of gate 52. Consequently, since both input terminals 96 and 136 are now at a "high" input signal, the output signal at terminal 100 of gate 52 becomes "low" which, in turn, is applied to input terminal 102 of gate 54. With this, gates 54 and 58 undergo latching by having: the output terminal 144 of gate 54 go "high"; the input terminal 146 of gate 58 go "high"; the output terminal 140 of gate 58 go "low" and the input terminal 142 of gate 54 go "low". As a result, and as previously explained. Darlington 152 is made conductive and pumping means 24 energized.

Generally, in an arrangement as described, it can be seen that the lower probe means 38 serves, as the liquid level is rising, as a condition sensor placing the overall circuitry in a state of readiness to be triggered by the upper probe means 40 when such is brought into contact with the liquid. Further, as the level of the liquid gradually lowers, the probe means 38 in effect serves to assure that a sufficient quantity of such liquid is pumped as to assure the liquid level attaining at least a predetermined lower level.

In view of the preceding, it should be apparent that the logic disclosed by the teachings of the invention could be employed, for example, in having three or more probe means for sensing the existance of various attained levels of liquid and, in turn, causing, for example, related sequential energization of a series of pumping means. This could especially be useful in, for example, large ships where first pumping means may not be able to handle hull seepage above a particular flow rate (as may be experienced during storms with little or no cargo) and wherein second pumping means may be able to provide the additional pumping capacity for such conditions but not for other seepage conditions as may be experienced during violent storms with full cargo. In the last exemplory condition, third pumping means would be energized. This would mean that smaller capacity pumps, at lower costs, could be employed and energized as needed and in response to continued rising of liquid level past a series of probe means.

As illustrated, the invention may preferably be provided with time delay means comprised of resistor 92 and capacitor 250 and comprised of resistor 128 and capacitor 254. That is, first considering resistor 128 and capacitor 254, as the water or liquid initially contacted probe 38, capacitor 254 became charged and such charge remained there through the entire described cycle of pumping means energization to shut-down. When the liquid level finally drops below the lower probe 38, capacitor 254 starts to discharge through the resistor 128 and diode 132 and in so doing, continues the application of the "high" signal to input terminal 130 of gate 58 thereby continuing the latched condition of gates 58 and 54 and maintaining the pumping means 24 energized. Capacitor means 254 and resistor means 128 define an R-C circuit which, in one successful tested embodiment, delayed the de-energization of pump means 24 for approximately ten seconds after the level of the liquid decreased below the level of probe 38. This effectively prevents the premature de-energization of the pumping means 24 as may otherwise occur due to sloshing or the like of the liquid causing a very brief interruption of contact as between the lower probe 38 and the sloshing liquid.

Similarly, considering resistor 92 and capacitor 250, when the level of the liquid rises sufficiently to contact upper probe 40, the initial current flow from output terminal 94 is ineffective to cause a "high" signal to occur at input terminal 96 of gate 52 until after capacitor 250 first becomes charged. Therefore, the R-C circuit comprised of resistor 92 and capacitor 250 is effective for causing a time delay between the time that the liquid first contacts the upper probe 40 and the time that input terminal 96 experiences a "high" input signal to ultimately energize pumping means 24. Consequently, such a "turn-on" time delay serves to prevent premature energization of the pumping means 24 due to, for example, sloshing or the like of the liquid causing a very brief contact as between the liquid and the upper probe 40. In one successful tested embodiment of the invention, the time delay provided by R-C network 92, 250 was in the order of ten seconds. However, as should be apparent, if time delay means are employed for delaying the turning on and/or off of pumping means 24, the magnitude of such time delay may be selected to be any desired value. Further, it is contemplated that when such time delay means are employed for delaying both the energization and de-energization of the pumping means, the magnitudes of such respective time delays need not be even substantially equivalent to each other and, in fact, may be at substantial variance with respect to each other. It is also contemplated that resistance means 92 and/or resistance means 128 may be variably adjustable resistance means as to enable, if desired, selective adjustment thereof when installed within, for example, a water craft as to accommodate for possibly unique conditions of that water craft and/or surface conditions of the water in which that water craft is situated.

In the preferred embodiment of the invention, related signal means 226 are provided in order to produce an output signal to indicate that the pumping means 24 has been energized for a preselected length of time. That is, in any particular situation given the volume of bilge liquid to be pumped-out and the pumping rate of the associated pumping means 24, it becomes possible to then determine the length of time that the pumping means must be energized in order to pump that given volume of bilge liquid to be pumped. If in that situation the pumping means continues to be energized especially for an extended time beyond that in which the pumping means should have been de-energized, such could be, for example: (a) the result of more bilge liquid having been originally present then normally expected and, therefore, the condition of the water craft hull should be checked in order to determine if unknown damage has been inflicted thereupon; (b) the result of internal damage in the pumping means and, therefore, the pumping means should be inspected; and/or (c) the result of the pumping system becoming clogged by dirt or the like.

In any event, it is preferred that the operator be notified that a predetermined length of energized pump time has elapsed so that related inspection and/or maintenance relative thereto can be performed.

To this end, referring to FIG. 2, the preferred embodiment of the invention provides suitable signal means 226 and associated circuit means. For example, when the output at terminal 140 of gate 58 goes "low", as previously described, capacitor 310 starts to charge and when it becomes sufficiently charged, both input terminals 164 and 166 receive a "low" input signal thereby causing the output at terminal 170 of gate 60 to go "high" resulting in transistors 208 and 216 being made conductive and enabling source 272 to energize the signal means 226. The charging time of capacitor 310, determined as by the R-C network of resistor 156 and capacitor 310, serves to establish the desired length of time after which the signal means 226 is activated. Preferably, zener diodes 232 and 375, as zener diode 206, are provided for transient protection.

Figure 3:
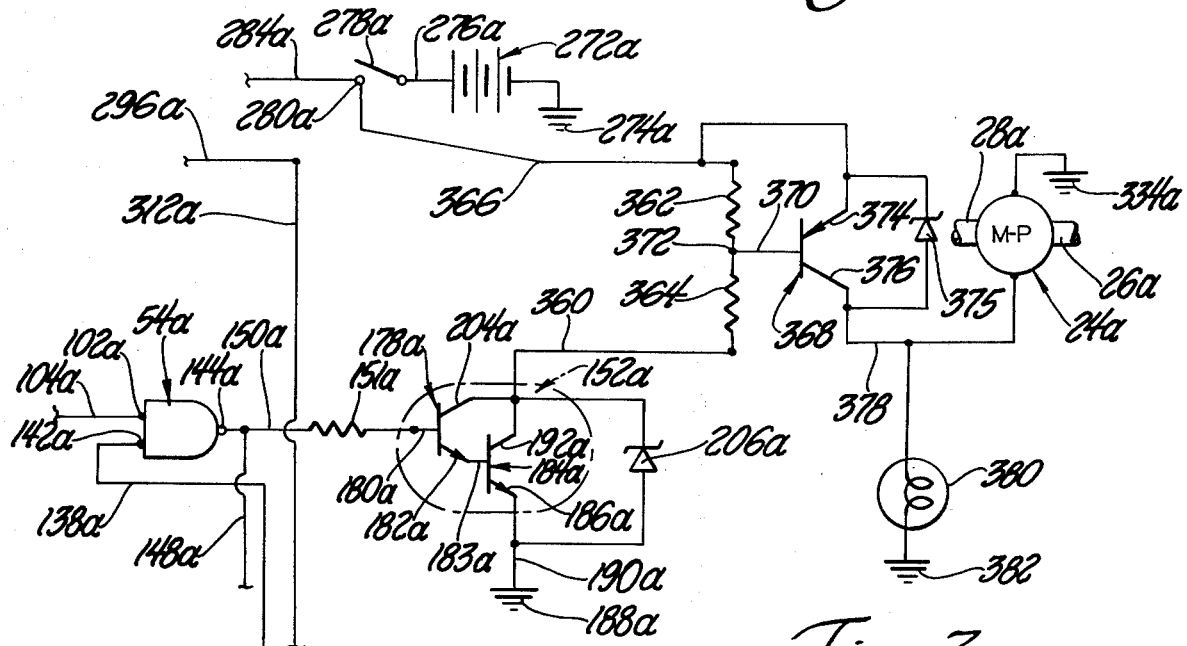
FIG. 3 is a fragmentary schematic wiring diagram illustrating a modification of the invention as disclosed in FIG. 2.

FIG. 3 illustrates a modification of the invention. Only those elements believed necessary to illustrate the modified form are illustrated and, further, such, if similar to those of preceding are identified with like reference numerals provided with a suffix "a". Otherwise, for purposes of discussion, the remainder of the modification of FIG. 3 may be considered as identical to the related remaining portion as shown in FIG. 2.

In the embodiment of FIG. 3, collector 192a of transistor 184a is electrically connected as via conductor means 360 to one end of a voltage divider, comprised of resistance means 362 and 364, which, at its other end, is connected as by conductor means 366 to terminal 280a. A PNP power transistor 368 has its base 370 connected to the voltage divider as at 372 and its emitter 374 connected to conductor means 366. The collector 376 of transistor 368 is connected as by conductor means 378 to pumping means 24a.

In the arrangement of FIG. 3, when Darlington 152a is made conductive, in the manner previously described with reference to Darlington 152 of FIG. 2, current flow through the voltage divider causes power transistor 368 to become conductive thereby completing the circuit to and energizing pumping means 24a. In such an embodiment, the conductor means 294 of FIG. 2 is not needed. Further, in the preferred arrangement, suitable signal means, such as, for example, visual signal means as in the form of bulb means 380 is electrically connected as to conductor means 378 and grounded as at 382. Such bulb means 380 is generally diagrammatically depicted as being located as at 42 of FIG. 1. Accordingly, whenever pumping means 380-42 indicates to the craft operator that the pumping means 24a is in an energized condition. Similarly, visual signal means in the form of bulb means may be provided as at 384, of the embodiment of FIG. 2, and connected to conductor means 332 while being grounded as at 386.

It is further contemplated, referring to FIG. 2, that the signal means 226 may in fact be auditory signal means as disclosed in, for example, U.S. Pat. No. 3,810,149 dated May 7, 1974, which is hereby incorporated by reference. If such auditory signal means as shown in, for example, FIGS. 1, 2 and 3 of said U.S. Pat. No. 3,810,149 were to be employed, electrical terminal means 66 and 94 thereof could be respectively electrically connected to conductor means 228 and 224 of FIG. 2 of the invention.

It should, of course, be apparent that the pumping means 24 may comprise a generally unitized electric motor and pump assembly or it may comprise separate electric motor means operativelyf connected to separate related pump assembly means. The specific form thereof forms no part of the invention and any suitable overall pumping means may be employed.

Figure 4:
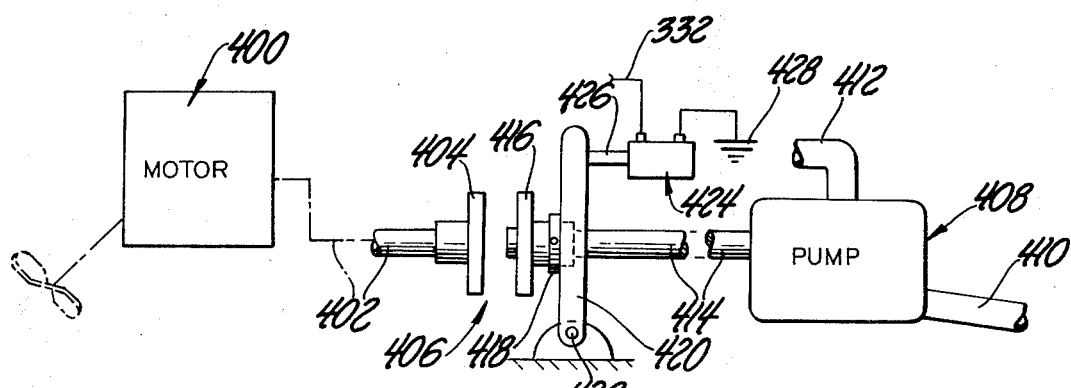
FIG. 4 is a simplified partially diagrammatic illustration of still another modification of the invention.

It is also contemplated that pumping means may be driven as by, for example, engine means employed for propelling the water craft. For example, FIG. 4 illustrates an arrangement wherein the water craft propelling motor means is shown at 400 with related power take-off and transmission means 402 having one portion 404 of clutch means 406 operatively secured thereto and driven thereby. Related bilge pump means 408, having an inlet conduit 410 and outlet conduit 412, has shaft means 414 which carries, as by a splined connection or the like, the second cooperating clutch portion 416 of clutch means 406. Suitable thrust bearing means 418, operatively connected to clutch member 416, is, in turn, operatively engageable by suitable lever-like means 420 so that as the lever 420 is rotated generally counterclockwise about pivot 422, lever 420, through bearing means 418, moves clutch member 416 into operative engagement with clutch member 404 thereby enabling motor 400 to drive pump 408 through take-off transmission 402 and shaft 414. A solenoid assembly 424, having a movable armature 426 operatively connected to lever 420, when actuated causes the lever 420 to thusly move counterclockwise about pivot 422. As depicted, solenoid assembly 424 may be grounded as at 428 while its other terminal is electrically connected as to conductor means 332 of FIG. 2 and, of course, in such an arrangement, the pumping means 24 are generally depicted in FIG. 2 would not be employed. Accordingly, in the modification contemplated in FIG. 4, when contacts 200 and 202 are closed (as previously described with reference to FIG. 2) solenoid assembly 424 becomes energized causing operative engagement of clutch members 404 and 416 and consequent activation of pump means 408.

Figure 5:
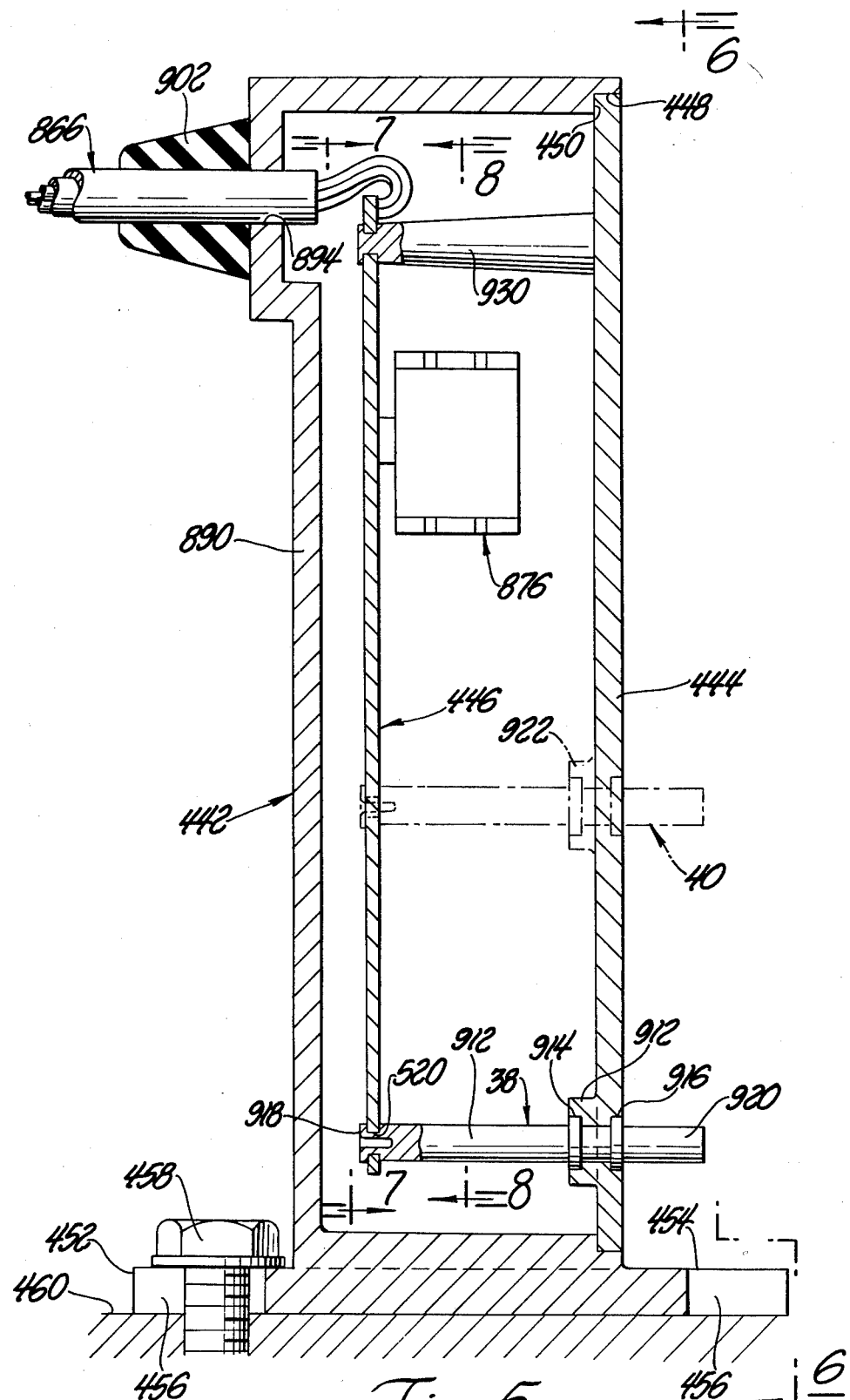
FIG. 5 is a cross-sectional view of one specific embodiment of the invention and such view may be considered as having been taken generally on the plane of line 5—5 of FIG. 6 and looking in the direction of the arrows.
Figure 6:
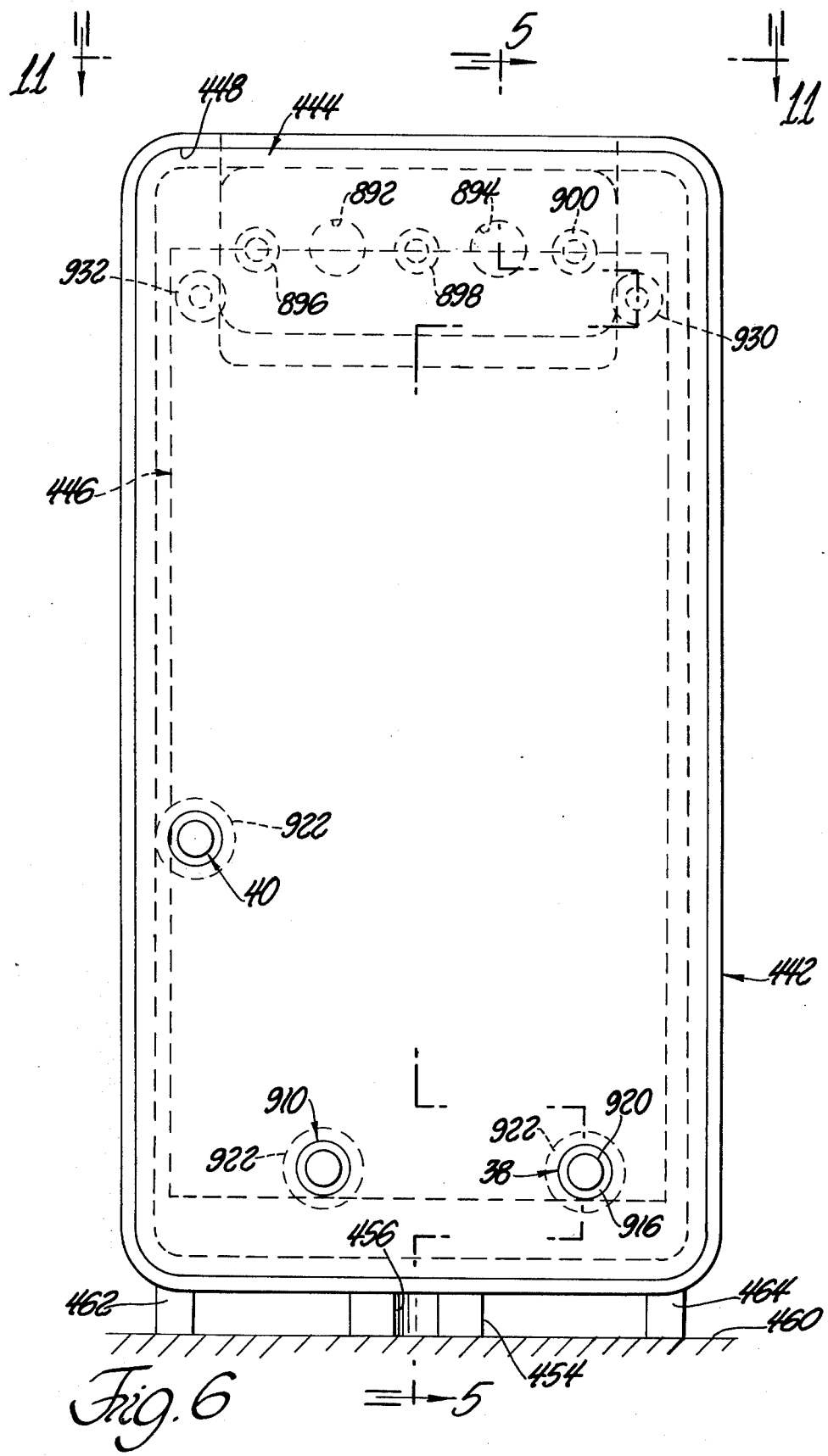
FIG. 6 is a generally side elevational view of the embodiment of FIG. 5 taken generally on the plane of line 6—6 of FIG. 5 and looking in the direction of the arrows.

FIGS. 5, 6, 7 and 8 illustrate one specific embodiment of the invention. Referring in greater detail first to FIGS. 5 and 6, the assembly 440 is illustrated as comprising a housing 442 and a cover 444 with a printed circuit board assembly 446 situated generally within the housing and operatively connected to the cover 444 as through probes 40 and 38. As can be seen, the cover 444 is received within a complementary opening 448 and abuts against a peripheral-like flange or shoulder 450 of the cover and preferably sealed thereagainst as by sonic welding or the like. The lower end wall of housing 442 is provided with laterally extending flange-like portions 452 and 454 each provided with a slot 456 as to accommodate related fastening means 458 in order to secure the assembly 440 as to a lower disposed mounting surface 460 of the related water craft. Further, as best seen in FIG. 6, additional laterally displaced stabilizing abutment means 462 and 464 are preferably integrally formed with housing 442 as to abut against the coacting mounting surface 460.

Figure 7:
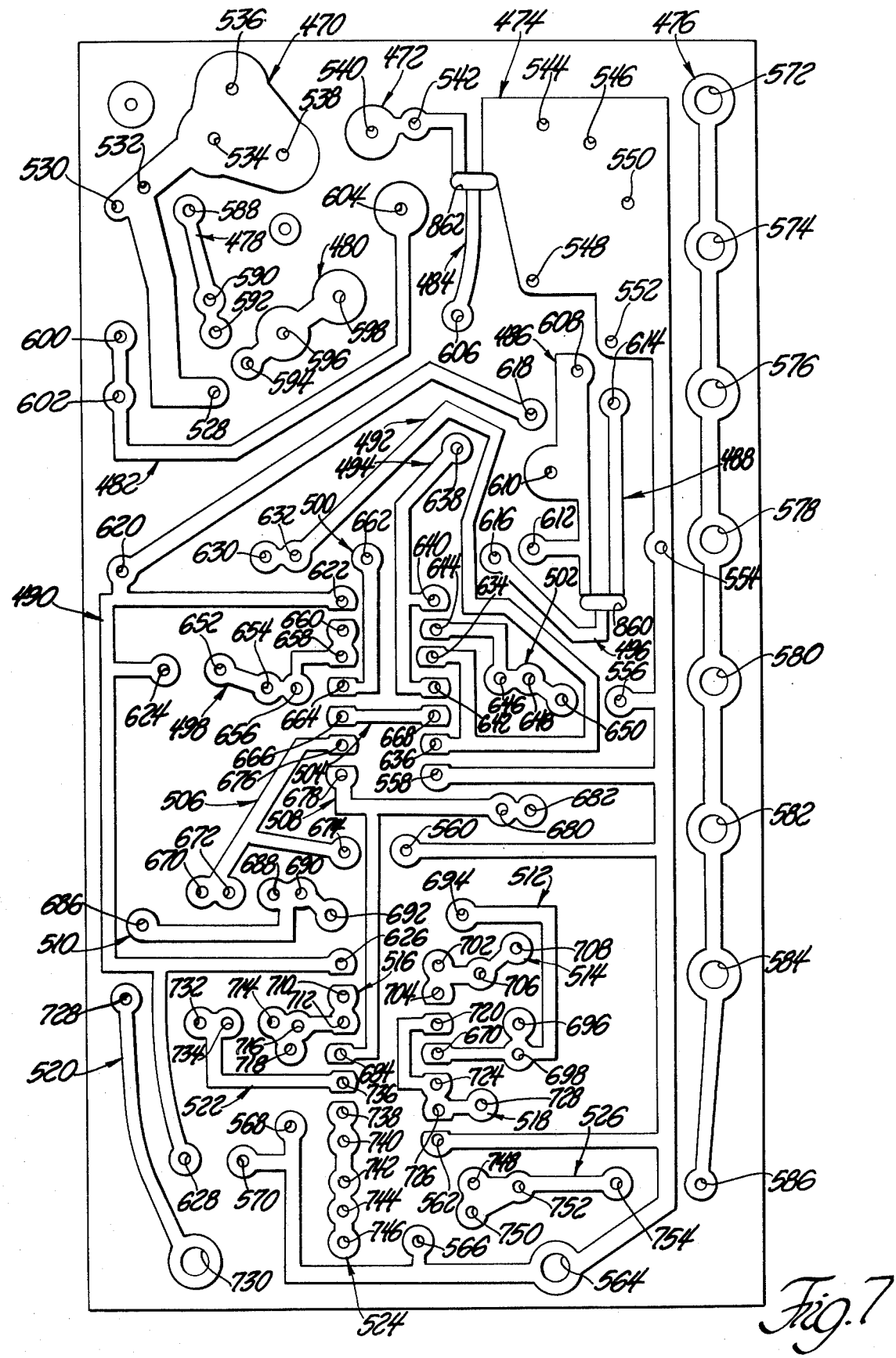
FIG. 7 is a view taken generally on the plane of line 7—7 of FIG. 5 and looking in the direction of the arrows.

Referring to FIG. 7, the printed circuit board assembly 446 is illustrated as preferably comprising a plurality of printed circuit portions 470, 472, 474, 476, 478, 480, 482, 484, 486, 488, 490, 492, 494, 496, 498, 500, 502, 504, 506, 508, 510, 512, 514, 516, 518, 520, 522, 524, and 526. Printed circuit portion 470 is shown provided with apertures 528, 530, 532, 534, 536 and 538; portion 472 is shown provided with apertures 540 and 542; portion 474 is shown provided with apertures 544, 546, 548, 550, 552, 554, 556, 558, 560, 562, 564, 566, 568 and 570; portion 476 is shown provided with apertures 572, 574, 576, 578, 580, 582, 584, and 586; portion 478 is shown provided with apertures 588, 590 and 592; portion 480 is shown provided with apertures 594, 596 and 598; portion 482 is shown provided with apertures 600, 602 and 604; portion 484 is provided with aperture 606; portion 486 is shown provided with apertures 608, 610 and 612; portion 488 is provided with aperture 614; portion 496 is provided with aperture 616; portion 490 is shown provided with apertures 618, 620, 622, 624, 626 and 628; portion 492 is shown provided with apertures 630, 632, 634 and 636; portion 494 is shown provided with apertures 638, 640 and 642; portion 502 is shown provided with apertures 644, 646, 648 and 650; portion 498 is shown provided with apertures 652, 654, 656, 658 and 660; portion 500 is shown provided with apertures 662 and 664; portion 504 is shown provided with apertures 666 and 668; portion 506 is shown provided with apertures 670, 672 674 and 676; portion 508 is shown provided with apertures 678, 680, 682 and 684; portion 510 is shown provided with apertures 686, 688, 690 and 692; portion 512 is shown provided with apertures 694, 696, 698 and 700; portion 514 is shown provided with apertures 702, 704, 706 and 708; portion 516 is shown provided with apertures 710, 712, 714, 716 and 718; portion 518 is shown provided with apertures 720, 722, 724 and 726; portion 520 is shown provided with apertures 728 and 730; portion 522 is provided with apertures 732, 734 and 736; portion 524 is shown provided with apertures 738, 740, 742, 744 and 746; and circuit portion 526 is shown provided with apertures 748, 750, 752 and 754.

Figure 8:
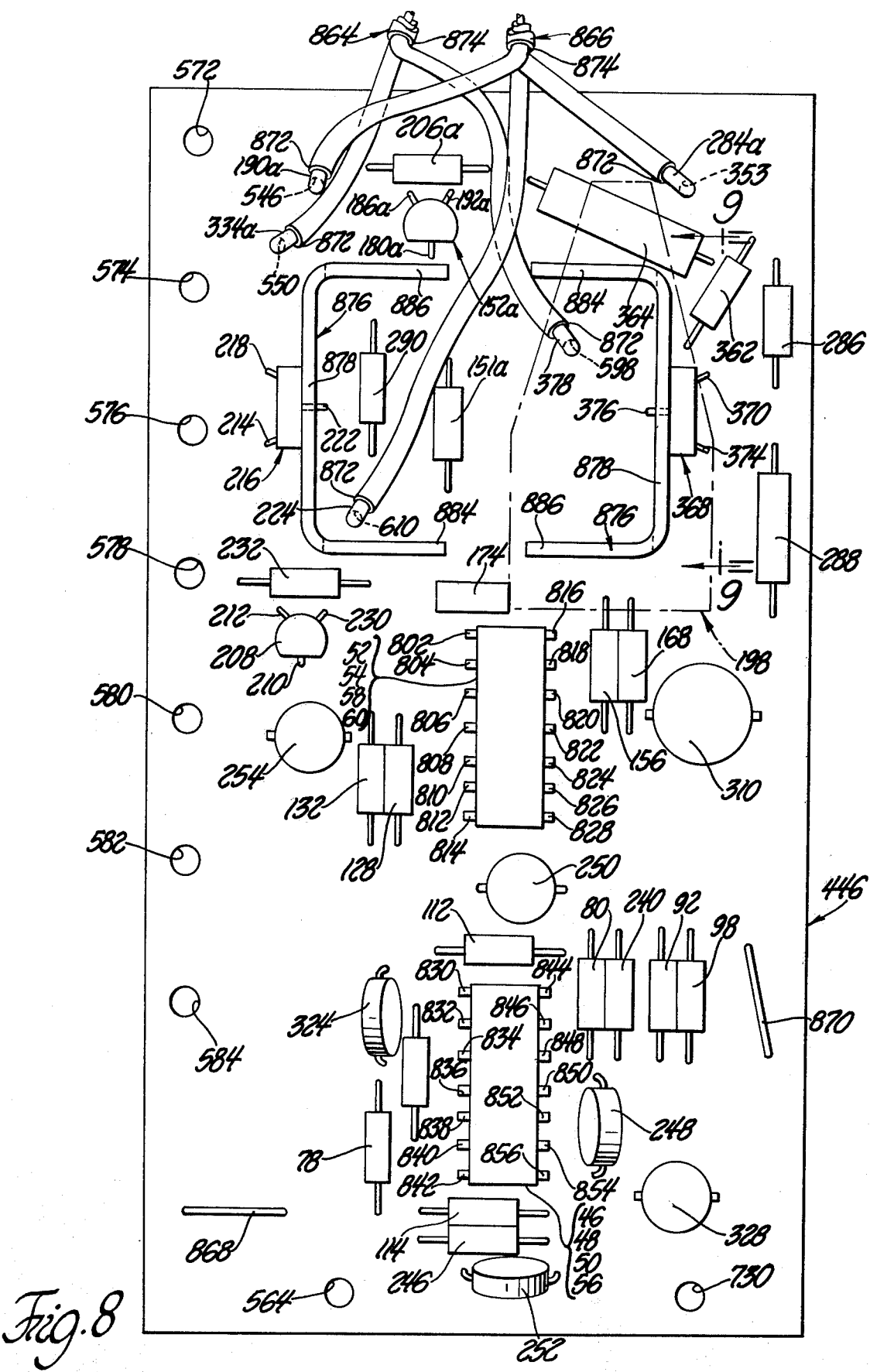
FIG. 8 is a view taken generally on the plane of line 8—8 of FIG. 5 and looking in the direction of the arrows.

Referring to both FIGS. 7 and 8, it can be seen that quad-chip 46, 48, 50, 56 has its electrical leads 830, 832, 834, 836, 838, 840 and 840 respectively received in apertures 702, 704, 720, 670, 724, 726, and 562 while its leads 844, 846, 848, 850, 852, 854 and 856 are respectively received in apertures 626, 710, 712, 684, 736, 738 and 740. Diode 114 has its opposite leads respectively received in apertures 742 and 748; resistor 246 has its leads received by apertures 744 and 750; capacitor 252 has its leads received by aperture 746 and 566; capacitor 328 has its leads received by apertures 628 and 570; capacitor 248 has its leads received by apertures 718 and 568; capacitor 324 has its leads received by apertures 696 and 708; resistor 78 has its leads received by apertures 752 and 698; resistor 326 has its leads received by apertures 706 and 728; resistor 112 has its opposite leads received by apertures 692 and 694; diode 80 has its opposite leads received in apertures 690 and 716; resistor 240 has its leads received in apertures 688 and 714; resistor 92 has its leads received in apertures 672 and 734; diode 98 has its leads in apertures 670 and 732; capacitor 250 has its leads in apertures 674 and 560; capacitor 310 has its leads in apertures 624 and 652; capacitor 254 has its leads in apertures 556 and 650; quad-chips 52, 54, 58 60 has its leads 802, 804, 806, 808, 810, 812, 814, 816, 818, 820, 822, 824, 826 and 828 respectively received in apertures 640, 644, 634, 642, 668, 636, 558, 622, 660, 658, 664, 666, 676 and 678; diode 132 has its opposite leads received in aperture 682 and 648; resistor 128 has its leads received in apertures 680 and 646; resistor 156 has its leads received in apertures 632 and 656; diode 168 has its leads in apertures 630 and 654; diode 232 has its leads in apertures 612 and 554; resistor 174 has its leads in apertures 616 and 662; transistor 208 has its terminals 210, 212 and 230 received through a common opening 860 and respectively placed in contact with printed circuit portions 496, 488 and 486; resistor 288 has its opposite leads received in apertures 602 and 620; diode 286 has its leads received in apertures 600 and 530; resistor 362 has its leads in apertures 532 and 592; resistor 364 has its leads received in apertures 588 and 540; transistor 368 has its terminals 370, 374 and 376 respectively received in apertures 590, 528 and 594; diode 206a has its leads received in apertures 544 and 542; transistor 152a has its terminals 180a, 186a and 192a collectively received through a slot-like opening 862 and respectively placed in contact with printed circuit portions 484, 474 and 472; resistor 151a has its leads received in apertures 606 and 638; zener diode 290 has its leads received in apertures 548 and 618; and transistor 216 has its terminals 214, 218 and 222 respectively received by apertures 614, 552 and 608. Further, cable means 864 and 866 are provided with cable 864 being comprised of conductor means 334a and 378 while cable 866 comprises conductor means 190a, 224 and 284a. Conductor 190a is received in aperture 546, conductor 334a is received in aperture 550, conductor 224 is received in aperture 610, conductor 378 is received in aperture 598 and conductor 284a is received in aperture 534. Also, jumper or bridging type conductors 868 and 870 are provided with the opposite ends of conductor 868 being received in apertures 754 and 586 while conductor 870 has its opposite ends received in apertures 686 and 728.

Obviously, all of such leads and conductors situated generally within the recited apertures and openings are suitable electrically connected to the associated printed circuit portions as by, for example, soldering.

As generally indicated, the conductors of cables 864 and 868 are preferably individually provided with outer electrically insulating material 872 and are, in turn, contained with respective common outer liquid sealing sheathing or covering 874.

Preferably, and as depicted, transistors 216 and 368 are each operatively connected to respective generally U-shaped heat sinks 876. As generally typically illustrated in FIGS. 9 and 10, the transistor, such as 368, is preferably secured to and in intimate contact with the bight portion 878 of the heat sink 876 as through coacting washer 880 and screw 882 threadably engaged with bight portion 878. As best seen in FIG. 10, the arms 884 and 886 of the heat sinks 876 are preferably formed with slots 888 as to thereby increase the effective heat dissipating surface area and to enhance air flow.

As also generally depicted in phantom line in FIG. 8, if instead of the solid state version of FIG. 3, the relay version of FIG. 2 were to be employed, the relay 198 would be situated generally as depicted in phantom line, in FIG. 8, replacing the transistor 368 and associated heat sink 876.

Referring to FIGS. 5, 6 and 11 in conjunction with FIG. 8, it can be seen that wall 890 of housing 442 is provided with apertures 892 and 894 for enabling the passage therethrough of cables 864 and 866. Further a plurality of tubular-like extensions 896, 898 and 900 are also integrally formed in wall 890 and arranged as to be extending generally outwardly therefrom and situated as to have their axis generally passing through a line of centers determined by the axis of apertures 892 and 894. Preferably such extensions are situated on either side of apertures 892 and 894. A sealing member 902, tightly receiving extensions 896, 898 and 900 as well as cables 864 and 866 is then preferably tightly pressed thereabout and against wall 890 as by a plurality of screws 904, 906 and 908 respectively threadably engaged with extensions 896, 898 and 900.

As indicated in both FIGS. 5 and 6, printed circuit assembly 446 comprises electrically conductive probes 40, 38 and 910 with probes 40 and 38 being, respectively, the upper and lower level sensing probes schematically shown in FIGS. 1 and 2 while probe 910 is an electrically grounding probe or conductor means. In the embodiment disclosed, upper probe 40 has its one or inner end received through aperture 582 as to be in electrical contact with printed circuit portion 476 while probe 38 has its inner end received through aperture 730 as to be in electrical contact with printed circuit portion 520. The ground probe 910, similarly, has its inner end received through aperture 564 as to be in electrical contact with circuit portion 474.

All of such probes may be substantially identical and, as shown typically by probe 38, may be comprised of stainless steel having a major cylindrical body 912 with integrally formed annular flanges 914, 916 with an inner end 918 mechanically deformable as to lock such end onto the printed circuit board. The other end 920 extends beyond cover 444 as to be exposed to the bilge liquid. Preferably a boss-like portion 922 is provided by cover 444 which serves to coact with flanges 914 and 916, as by molding thereagainst and therebetween, to rigidly secure the cover to the related probe. It should be pointed out that the plurality of aperture 572, 574, 576, 578, 580, 582 and 584 are provided in order to enable the selective location of the upper probe 40 at any such aperture, in any particular embodiment, in order to thereby attain the desired distance between the upper and lower probes 40 and 38 and thusly establish the bilge liquid level therebetween; that is, the elevation to which such liquid has to rise in order to activate the pumping means as previously described.

Further, additional generally cylindrical supports 930 and 932 are provided at the other end as to be operatively secured to both the cover 444 and the printed circuit board and thereby hold that end of the printed circuit board assembly in spaced relationship to the cover 444.

The embodiment as disclosed in FIGS. 5, 6, 7, 8, 9, 10 and 11 is made to be sealed as to prevent any leakage of the bilge liquid into the interior thereof thereby permitting such to be mounted in the water craft at any desired location without any short circuits occurring due to such leakage.

As should be apparent, the probes 38 and 40, in the embodiments disclosed, employ alternating current; that is the preferred mode of operation. However, it should also be apparent that the invention can be practiced by having such probes 38 and 40 employ direct current.

As has been previously stated, it is apparent that the invention, although described with reference to a bilge pumping system, is in fact capable of being practiced in various different environments and may, for example, be employed in situations for detecting a preselected level (or even a series of levels) of a particular liquid and to, in response thereto, creating or causing selected outputs to occur even to the extent that such outputs need not necessarily involve a pumping means.

Although only a preferred embodiment and selected modifications of the invention have been disclosed and described, it is apparent that other embodiments and modifications of the invention are possible within the scope of the appended claims.

I claim:

1. Liquid level sensing apparatus, comprising at least first and second electrical probe means, electrical logic circuit means operatively interconnecting said at least first and second electrical probe means, said electrical logic circuit means being effective for creating a first output of a first electrical magnitude when said liquid is at a predetermined elevation relative to said at least first and second electrical probe means as to be in contact with said first and second electrical probe means, said electrical logic circuit means being effective to continue creating said first output for a first predetermined span of time next following that instant at which said level of said liquid decreases from said predetermined elevation to a second elevation whereat said liquid ceases to contact both said first and second electrical probe means, said electrical logic circuit means being effective to prevent the creation of said first output of said first electrical magnitude by instead creating a second output of a second electrical magnitude for a second predetermined span of time next following that instant at which said liquid level moves from an elevation relatively lower than said predetermined elevation and attains said predetermined elevation, and output means effective for receiving said first and second outputs and producing a related response relative thereto.

2. Apparatus according to claim 1 and further comprising timing means, said timing means being effective to cause a sensory output signal to be produced whenever said first output of a first electrical magnitude has existed continuously for a second preselected span of time.

3. Apparatus according to claim 2 and further comprising related output circuit means, wherein said output means comprises solid state semiconductor means effective for electrically opening and closing said related output circuit means, and further comprising liquid pumping means, said pumping means being actuated into its pumping cycle whenever said semiconductor means closes said related output circuit means, said pumping means comprising a pump assembly and an electric motor for driving said pump assembly, wherein said related output circuit means is operatively electrically connected to said electric motor, wherein said electric motor is energized upon said semiconductor means closing said related output circuit means, and further comprising generating means for generating a second sensory signal, said generating means being operatively electrically connected to said related output circuit means as to be energized whenever said related output circuit means is closed.

4. Apparatus according to claim 1 wherein said first and second electrical probe means are respectively effective to be contacted by said liquid at differing elevations.

5. Apparatus according to claim 4 wherein said first and second electrical probe means are each positioned as to be generally laterally disposed to the general plane of the level of said liquid.

6. Apparatus according to claim 1 wherein said output means comprises electrically energizable relay means effective for opening and closing related output circuit means.

7. Apparatus according to claim 6 and further comprising liquid pumping means, said pumping means being actuated into its pumping cycle whenever said relay means closes said related output circuit means.

8. Apparatus according to claim 7 and further comprising sensory signal means, said sensor signal means being activated whenever said pumping means is actuated into its pumping cycle.

9. Apparatus according to claim 7 wherein said pumping means comprises a pump assembly and an electric motor for driving said pump assembly, and wherein said electric motor is energized upon said relay means closing said related output circuit means.

10. Apparatus according to claim 7 wherein said pumping means comprises a pump assembly and an electric motor for driving said pump assembly, wherein said related output circuit means is operatively electrically connected to said electric motor, wherein said electric motor is energized upon said relay means closing said related output circuit means, and further comprising sensory signal generating means, said sensory signal generating means being operatively electrically connected to said related output circuit means as to be energized whenever said related output circuit means is closed.

11. Apparatus according to claim 6 wherein said output means further comprises solid state semiconductor means in circuit with said relay means, said semiconductor means being placed into a conductive state when acted upon by said first output of a first electrical magnitude to thereby energize said relay means and cause closing of said related output circuit means.

12. Apparatus according to claim 6 wherein said electrical logic circuit means comprises R-C network means situated generally between the first and second electrical probe means and said output means.

13. Apparatus according to claim 1 wherein said output means comprises solid state semiconductor means effective for electrically opening and closing associated output circuit means.

14. Apparatus according to claim 13 and further comprising liquid pumping means, said pumping means being actuated into its pumping cycle whenever said semiconductor means closes said related output circuit means.

15. Apparatus according to claim 14 and further comprising signal means, said signal means being activated whenever said pumping means is actuated into its pumping cycle.

16. Apparatus according to claim 14 wherein said pumping means comprises a pump assembly and an electric motor for driving said pump assembly, and wherein said electric motor is energized upon said semiconductor means closing said related output circuit means.

17. Apparatus according to claim 14 wherein said pumping means comprises a pump assembly and an electric motor for driving said pump assembly, wherein said related output circuit means is operatively electrically connected to said electric motor, wherein said electric motor is energized upon said semiconductor means closing said related output circuit means, and further comprising sensory signal generating means, said sensory signal generating means being operatively electrically connected to said related output circuit means as to be energized whenever said related output circuit means is closed.

18. Apparatus according to claim 1 wherein said first electrical probe means is effective for sensing the presence of said liquid only when said liquid has attained at least said predetermined elevation, wherein said second electrical probe means is effective for sensing the presence of said liquid only when said liquid has attained at least a second predeteremined elevation which is less than said predetermined elevation, wherein said electrical logic means comprises inhibiting means, wherein said inhibiting means comprises first and second time delay means, wherein said first time delay means is effective for causing said second output of a second electrical magnitude to be created for said second predetermined span of time whenever said liquid level moves from an elevation relatively lower than said predetermined elevation and attains said predetermined elevation, and wherein said second time delay means is effective for causing said first output of a first electrical magnitude to be continued to be created for said first predetermined span of time whenever said liquid level moves from said predetermined elevation to said second elevation.

19. Electrical circuit means for detecting the level of an associated liquid and creating a related fourth signal comprising first branch circuit means, second branch circuit means, said first branch circuit means comprising first electrically conductive probe means responsive to contact with said liquid when said liquid is at a first relatively low level for completing a first electrical circuit therethrough and producing a first signal, first electrical logic means responsive to said first signal for in turn producing a second signal indicative thereof, said second branch circuit means comprising second electrically conductive probe means responsive to contact with said liquid when said liquid is at a second relatively high level for completing a second electrical circuit therethrough and producing a third signal, second electrical logic means responsive to said third signal for in turn producing a fourthsignal indicative thereof, third electrical logic means effective to receive said second and fourth signals and in response thereto causing a first output signal to be produced, first electrical timing means effective to prevent said second signal from being applied to said second electrical logic means for a first preselected span of time immediately following initial contact between said second electrically conductive probe means and said liquid when said liquid is at said second relatively high level. and second electrical timing means, said second electrical timing means being effective to cause said first signal to continue to be applied to said first electrical logic means for a second preselected span of time immediately subsequent to both the production of said second signal and the termination of said contact between said liquid and said first and second electrically conductive probe means.

20. Electrical circuit means according to claim 19 and further comprising Darlington circuit means, and wherein said first output signal is applied to said Darlington circuit means in order to cause said Darlington circuit means to be conductive.

21. Electrical circuit means according to claim 19 wherein said first branch circuit means comprises third branch circuit means, and wherein said third branch circuit means is effective for applying said first signal to also said second electrical logic means.

22. Electrical circuit means according to claim 19 and further comprising third timing means, and sensory warning means, said third timing means being effective to cause activation of said sensory warning means upon the expiration of a third preselected span of time measured from the instant of production of said fourth signal.

23. Electrical circuit means for detecting the level of an associated liquid and creating a related output, comprising first branch circuit means, second branch circuit means, said first branch circuit means comprising first electrically conductive probe means responsive to contact with said liquid when said liquid is at a first relatively low level for completing a first electrical circuit therethrough and producing a first signal, first electrical logic means responsive to said first signal for in turn producing a second signal indicative thereof, said second branch circuit means comprising second electrically conductive probe means responsive to contact with said liquid when said liquid is at a second relatively high level for completing a second electrical circuit therethrough and producing a third signal, second electrical logic means responsive to said third signal for in turn producing a fourth signal indicative thereof, third electrical logic means effective to receive said second and fourth signals and in response thereto causing a first output signal to be produced, electrically insulating housing means sealed against admission of said liquid into the interior thereof, printed circuit board means situated in said interior, said first and second branch circuit means carried by said printed circuit board means, said first second and third electrical logic means carried by said printed circuit board means, aperture means formed in said housing means sealingly receiving said first and second probe means therethrough, a first mounting aperture formed in said printed circuit board means effective for receiving said first probe means, and a plurality of second mounting apertures spaced from each other and formed in said printed circuit board means, said second probe means being selectively mounted to any of said second mounting apertures.

24. Electrical circuit means for detecting the level of an associated liquid and creating a related output, comprising first branch circuit means, second branch circuit means, said first branch circuit means comprising first electrically conductive probe means responsive to contact with said liquid when said liquid is at a first relatively low level for completing a first electrical circuit therethrough and producing a first signal, first electrical logic means responsive to said first signal for in turn producing a second signal indicative thereof, said second branch circuit means comprising second electrically conductive probe means responsive to contact with said liquid when said liquid is at a second relatively high level for completing a second electrical circuit therethrough and producing a third signal, second electrical logic means responsive to said third signal for in turn producing a fourth signal indicative thereof, third electrical logic means effective to receive said second and fourth signals and in responsive thereto causing a first output signal to be produced, electrically insulating housing means sealed against admission of said liquid into the interior thereof, printed circuit board means situated in said interior, said first and second branch circuit means carried by said printed circuit board means, said first second and third electrical logic means carried by said printed circuit board means, aperture means formed in said housing means sealingly receiving said first and second probe means therethrough, a first mounting aperture formed in said printed circuit board means effective for receiving said first probe means, and a second mounting aperture formed in said printed circuit board means for receiving said second probe means.

25. Electrical circuit means for detecting the level of an associated liquid and creating a related output, comprising first branch circuit means, second branch circuit means, said first branch circuit means comprising first electrically conductive probe means responsive to contact with said liquid when said liquid is at a first relatively low level for completing a first electrical circuit therethrough and producing a first signal, first electrical logic means responsive to said first signal for in turn producing a second signal indicative thereof, said second branch circuit means comprising second electrically conductive probe means responsive to contact with said liquid when said liquid is at a second relatively high level for completing a second electrical circuit therethrough and producing a third signal, second electrical logic means responsive to said third signal for in turn producing a fourth signal indicative thereof, and third electrical logic means effective to receive said second and fourth signals and in response thereto causing a first output signal to be produced, electrically insulating housing means sealed against admission of said liquid into the interior thereof, printed circuit board means situated in said interior, said first and second branch circuit means carried by said printed circuit board means, said first second and third electrical logic means carried by said printed circuit board means, aperture means formed in said housing means sealingly receiving said first and second probe means therethrough, and said first and second probe means being carried by said printed circuit board means.

26. Liquid level sensing and pumping apparatus, comprising a first electrically conductive probe situated as to be placed in contact with said liquid when the elevational level of said liquid attains a first predetermined relatively low elevational level, a second electrically conductive probe situated as to be placed in contact with said liquid when the elevational level of said liquid attains a second predetermined relatively high elevational level, said first electrically conductive probe being in contact with said liquid in the entire range of elevational liquid levels from and including said first predetermined relatively low elevational level and said second predetermined relatively high elevational level, pumping means effective when energized to pump said liquid to a selected area, and electrical circuit means electrically operatively interconnecting said first and second probes to said pumping means, said electrical circuit means being effective to cause energization of said pumping means only after said second electrically conductive probe has been continously in said contact with said liquid for a first preselected span of time, said electrical circuit means being effective after initially causing said energization to continue said energization of said pumping means even as the elevational level of said liquid decreases from said second predetermined relatively high elevational level and progresses toward said first predetermined relatively low elevational level, said electrical circuit means also being effective after initially causing said energization to continue said energization of said pumping means not only as the elevational level of said liquid decreases from said second level toward said first level but also being effective to continue said energization until the elevational level of said liquid decreases to a third elevational level which is elevationally lower than said first predetermined relatively low elevational level, the elevational difference between said first predetermined relatively low elevational level and said third elevational level being determined by a second preselected span of time of said continued energization, said second preselected span of time being measured from the instant at which said decreasing elevational level of said liquid ceases to contact said first probe.

* * * * *

UNITED STATES PATENT AND TRADEMARK OFFICE
CERTIFICATE OF CORRECTION

PATENT NO. : 4,171,932
DATED : October 23, 1979
INVENTOR(S) : Gerald K. Miller

It is certified that error appears in the above—identified patent and that said Letters Patent is hereby corrected as shown below:

Column 2, line 15, after "This" change "raisd" to -- raised --.

Column 10, line 43, "operativelyf" should read -- operatively --.

Column 14, line 27, "isapparent" should read -- is apparent --.

Column 16, line 5, Claim 19, line 2, "fourth signal" should read -- output, --.

Column 17, line 6, Claim 19, line 17, "fourthsignal" should read -- fourth signal --.

Column 17, line 15, Claim 19, line 26, immediately after "high level" change the period (.) to a comma (,).

Signed and Sealed this

First Day of April 1980

[SEAL]

Attest:

SIDNEY A. DIAMOND

Attesting Officer    Commissioner of Patents and Trademarks

UNITED STATES PATENT AND TRADEMARK OFFICE
CERTIFICATE OF CORRECTION

PATENT NO. : 4,171,932
DATED : October 23, 1979
INVENTOR(S) : Gerald K. Miller

It is certified that error appears in the above-identified patent and that said Letters Patent are hereby corrected as shown below:

Column 2, line 15, after "This" change "raisd" to --- raised ---.

Column 10, line 43, change "operativelyf" to --- operatively ---.

Column 14, line 27, change "isapparent" to --- is apparent ---.

Claim 19, line 2 thereof, cancel "fourth signal" and substitute therefor --- output, ---.

Claim 19, line 17 thereof, cancel "fourthsignal" and substitute therefor --- fourth signal ---.

Claim 19, line 26 thereof, immediately after "high level" change the period (.) to a comma (,).

THIS CERTIFICATE SUPERSEDES CERTIFICATE OF CORRECTION ISSUED April 1, 1980.

Signed and Sealed this

Twenty-second Day of July 1980

[SEAL]

Attest:

SIDNEY A. DIAMOND

Attesting Officer    Commissioner of Patents and Trademarks